J. E. & E. SLEGEL.
Stay and Guide Bar for Vehicle Springs.
No. 94,519. Patented Sept. 7, 1869.
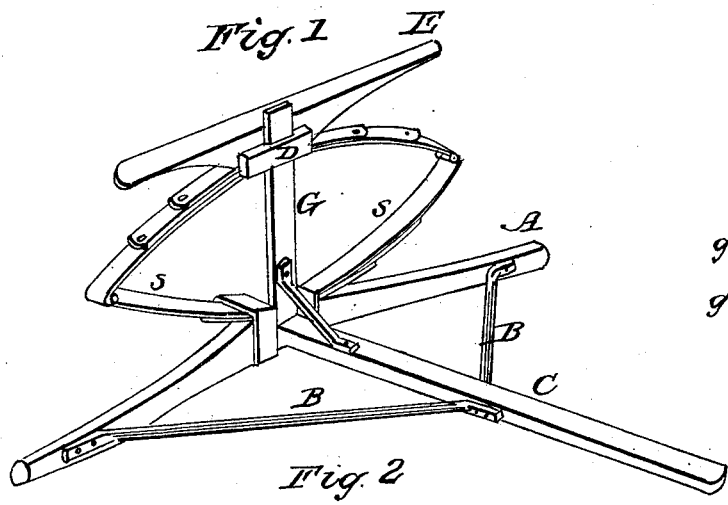
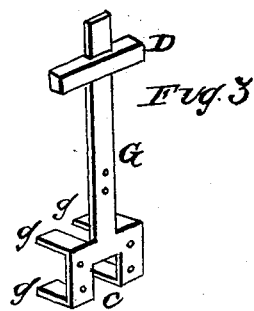
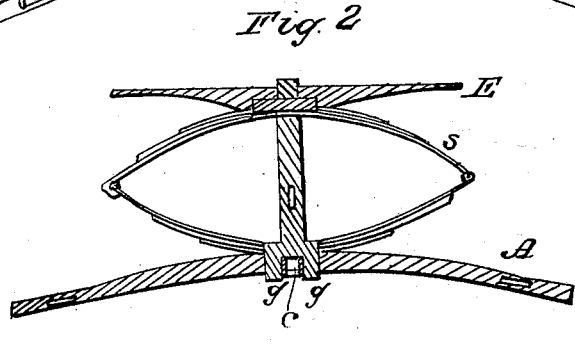
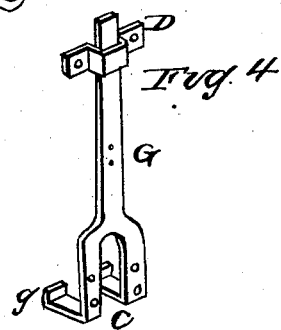
Witnesses
Wm H Schoener
Jac C. Schoener
Inventors
Joel E. Slegel
Eli Slegel

United States Patent Office.

JOEL E. SLEGEL AND ELI SLEGEL, OF READING, ASSIGNORS TO THEMSELVES AND JOHN K. HERTZ, OF LANCASTER COUNTY, PENNSYLVANIA.

Letters Patent No. 94,519, dated September 7, 1869.

STAY AND GUIDE-BAR FOR ELLIPTIC SPRINGS FOR VEHICLES.

The Schedule referred to in these Letters Patent and making part of the same.

*To all whom it may concern:*

Be it known that we, JOEL E. SLEGEL and ELI SLEGEL, of Reading, in the county of Berks, and State of Pennsylvania, have invented an Improved Stay and Guide-Bar for Elliptic Springs on Vehicles; and we do hereby declare that the following is a clear and exact description of the construction and operation of the same, reference being had to the accompanying drawings, making a part of this specification, in which—

Figure 1 is a perspective view of a portion of a vehicle, with our improvement in place.

Figure 2, an elevation of the same.

Figures 3 and 4, modifications of the guide and stay-bar detached.

The nature of our invention consists in providing a central stay on elliptical springs, in such a manner as to act as a guide in their perpendicular up-and-down motion, allowing them free play, and yet staying them so as to relieve them from the strain upon them by a sudden lurch or jerk when an object is struck by the wheels. Thus greater elasticity to the springs can be given, and increase their durability, while at the same time it adds to the comfort in the motion of the springs.

To enable others skilled in the art to make and use our invention, a few remarks will suffice, as the drawings clearly show the construction and application of the same.

A, the axle.
S, the springs.
E, the spring-bar.
C, the coupling of an ordinary buggy.
The vertical bar G is supported by and guides the springs in their vertical motion by its passage through the slotted plate or staple D, connected to the spring-bar E. The lower end of the bar G embraces the axle and lower portion of the combined elliptical springs, by its bifid ends $g$, one on each side of the coupling C, to which latter it is also stayed by a brace or braces, to secure its firmness, and strength to resist the longitudinal strain; the lateral strain is taken off by the foot-bands $g$.

We are aware that sliding braces, guides, and spring-supports, have been used in several forms, differing substantially, however, in their construction and application, and not adapted to light vehicles, as is our central guide and spring stay-bar, which is neat in appearance, simple in construction, and can be easily applied. As an article especially manufactured for the purpose, the utility of this device cannot be questioned, as it is self-evident, as well as demonstrated by actual trial.

We do not claim a stay or guide-rod or bar when connected with a bow, and attached with it to the head-block.

What we claim as our invention, and desire to secure by Letters Patent, is—

A stay and guide-bar, G, disconnected from the head-block E, and provided with open foot-clamps $g$ of one piece, substantially in the manner and for the purpose shown and set forth.

JOEL E. SLEGEL.
ELI SLEGEL.

Witnesses:
WM. B. SCHOENER,
JAC. C. SCHOENER.